(12) United States Patent
Arunan et al.

(10) Patent No.: US 7,715,354 B2
(45) Date of Patent: May 11, 2010

(54) METHOD OF BEACON EXCHANGE BETWEEN DEVICES WITH ASYMMETRIC LINKS AND SYSTEM USING THE METHOD

(75) Inventors: Thenmozhi Arunan, Bangalore (IN); Ji-Hoon Lee, Yongin-si (KR); Jung-Ho Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 705 days.

(21) Appl. No.: 11/647,573

(22) Filed: Dec. 29, 2006

(65) Prior Publication Data

US 2007/0183360 A1 Aug. 9, 2007

(30) Foreign Application Priority Data

Dec. 30, 2005 (IN) .................. 1983/CHE/2005
Dec. 8, 2006 (KR) ............. 10-2006-0124949

(51) Int. Cl.
*H04W 4/00* (2009.01)

(52) U.S. Cl. ............... 370/338; 370/318; 370/311; 370/315

(58) Field of Classification Search ........... 370/311, 370/315, 318, 328, 338, 445, 492, 449, 501; 455/69, 522, 11.1, 41.2, 507
See application file for complete search history.

(56) References Cited

U.S. PATENT DOCUMENTS 6,016,311 A 1/2000 Gilbert et al.

7,020,701 B1 * 3/2006 Gelvin et al. .............. 709/224

(Continued)

FOREIGN PATENT DOCUMENTS

JP 2003-224512 8/2003

(Continued)

OTHER PUBLICATIONS

William Cooper et al., "Modeling Dynamics Channel-Allocation Algorithms in Multi-BS TDD Wireless Networks With Internet-Based Traffic," May 2004, IEEE Transactions on Vehicular Technology, vol. 53, No. 3, pp. 783-804.

(Continued)

*Primary Examiner*—Kamran Afshar
(74) *Attorney, Agent, or Firm*—NSIP Law

(57) ABSTRACT

A method and a system for using the method are provided. The method and system allow a low power device having an asymmetric link to access a wireless network to exchange beacons with any one of a plurality of normal power devices in the wireless network. The method includes the steps of confirming whether the low power device has the asymmetric link with the normal power device, when the low power device receives a beacon of the low power device based on the received beacon; negotiating with at least one relay device so that the low power device requests a relay with respect to the asymmetric link, when the low power device has an asymmetric link with the normal power device; and at least one relay device noting a result of the negotiation to the low power device and a normal power device with which the low power device is intending to communicate, based on the result of the negotiation.

25 Claims, 11 Drawing Sheets

U.S. PATENT DOCUMENTS

2005/0243745 A1   11/2005   Stanwood et al.
2005/0249186 A1   11/2005   Kelsey et al.
2007/0133483 A1*  6/2007   Lee et al. .................... 370/338

FOREIGN PATENT DOCUMENTS

| JP | 2006-121280 | 5/2006 |
| --- | --- | --- |
| KR | 1020040016064 A | 2/2004 |
| KR | 1020040039305 A | 5/2004 |
| KR | 1020050107293 A | 11/2005 |

OTHER PUBLICATIONS

Kshirasagar Naik, et al., "Analysis of Packet Interference and Aggregated Throughput in a Cluster of Bluetooth Piconets Under Different Traffic Conditions," Jun. 2005, IEEE Journal on Selected Areas in Communications, vol. 23, No., pp. 1205-1218.

Saravanan Balasubramanian, et al., "Adaptive Online Scheduling for Asymmetric Wireless Sensor Networks," Proceedings of the Seventh IEEE International Symposium on Computer Networks, Jul. 2006, pp. 73-78.

* cited by examiner

PRIOR ART

FIG. 6

| N | LOW POWER DEVICE ID 1 | ... | LOW POWER DEVICE ID N | NORMAL POWER DEVICE ID 1 | ... | NORMAL POWER DEVICE ID N |
|---|---|---|---|---|---|---|

FIG. 7

| N | LOW POWER DEVICE ID | NORMAL POWER DEVICE ID 1 | ... | NORMAL POWER DEVICE ID N |
|---|---|---|---|---|

FIG. 8

| N | LOW POWER DEVICE ID 1 | ... | LOW POWER DEVICE ID N | NORMAL POWER DEVICE ID |
|---|---|---|---|---|

FIG. 9

| LOW POWER DEVICE ID | NORMAL POWER DEVICE ID | STATUS CODE |
|---|---|---|
| | | |

FIG. 10

| N | NORMAL POWER DEVICE ID 1 | ... | NORMAL POWER DEVICE ID N | BEACON OF DEVICE L |
|---|---|---|---|---|

METHOD OF BEACON EXCHANGE BETWEEN DEVICES WITH ASYMMETRIC LINKS AND SYSTEM USING THE METHOD

CROSS-REFERENCE TO RELATED APPLICATION

This application claims the benefit under 35 U.S.C. §119(a) of Indian Patent Application No. 1983/CHE/2005, filed on Dec. 30, 2005 in the Indian Patent and Trademark Office, and claims the benefit under 35 U.S.C. §119(a) of Korean Patent Application No. 10-2006-0124949, filed on Dec. 8, 2006 in the Korean Intellectual Property Office, the entire disclosures of both of said applications being incorporated herein by reference.

BACKGROUND OF THE INVENTION

1. Field of the Invention

The present invention relates to a wireless personal area network (WPAN). More particularly, the present invention relates to a method of beacon exchange between devices with asymmetric links and a system using the method in the WPAN which may efficiently reduce beacon slot collisions and distributed reservation protocol (DRP) collisions.

2. Description of the Related Art

As it is known to a person working in this field, wireless personal area networks are defined to operate in the personal operating space, i.e. in a range of approximately 10 meters. Some of the protocols defining the physical and data link layer of wireless personal area devices are governed by Institute of Electrical and Electronics Engineering (IEEE) Standards Board. Ultra Wide Band (UWB) technology can provide data rates exceeding several hundreds of Mbps in this personal operating space.

In wireless personal area networks, the medium is shared between all the devices for communication with each other. It necessitates that a medium access control (MAC) mechanism for the devices should be available to manage medium access, broadly including how it may join the network, how each device provides its information to the network, how it can transfer data at the required rate to another device, how the medium is best used and so on. Medium access control for wireless personal area networks can be designed in two approaches—centralized and distributed. In the centralized approach, one of the device acts on behalf of the whole network to coordinate in managing the media access operations for all the devices, and all other devices seek help of the centralized coordinator for media access operations like joining the network, reserving channel time and so on. In the distributed approach, the media access operations are distributed evenly across all the devices in the network and they share the load of managing media access operations for each other.

A wireless personal area network does not have any centralized coordinator, and the devices use the distributed approach for medium access control. All devices cooperate and share information with each other to perform media access control tasks such as allowing a new device to join, allocation of channel time to a device to transmit data to another device, synchronization mechanisms and so on. A distributed WPAN system is formed in an ad-hoc fashion, where devices become active and start broadcasting their identification and capabilities by means of a control frame known a the beacon. FIG. 1 gives a simplistic representation, where all devices are assumed to have the same transmit capabilities. Hence their range is shown to be the same. However, this assumption is not always valid, since devices can have varying capabilities and varying ranges for their communications.

The distributed media access control approach relies on a timing concept called the superframe. A superframe has a fixed length in time and is divided into a number of time windows, which are called time slots. Some of the time slots are used by the devices to send their beacons and the others are used by the devices to send the data. The slots in which beacon is sent are called beacon slots and the slots in which data is sent are called data slots. The length of a beacon slot can be less than the length of a data slot. The beacon slots typically appear together at the start of the superframe. In addition, the number of beacon slots may be fixed or variable, leading to different configurations of distributed Medium Access Control mechanisms.

A superframe consists of several Medium Access Slots, e.g. 256 Medium Access Slots (MAS). Some Medium Access Slots constitute a beacon period which comprises beacon slots used by multiple devices to send the beacon frame, and the remaining MASs constitute a data period, which may be used by different devices in the network to transmit data to other devices in the network. Typically, the superframe duration is 64 milliseconds and each MAS is of 256 microseconds duration. It is important to note here that the channel time allocation schemes and beaconing schemes should be independent of the actual values of these parameters. Information about the device's characteristics and its usage of the superframe is being broadcasted by each device in its beacon frame sent during the beacon period, so that the neighbors of the device can use that information for further processing. The start time of the superframe is determined by the beginning of the beacon period and defined as the beacon period start time (BPST). It is important to note here that the channel time allocation schemes should be independent of the actual values of these parameters. The MAC layer in each device maintains information about the device's individual neighborhood. The neighborhood of each device is defined by its transmission and reception range. All MAC protocol mechanisms are expressed with respect to this individual neighborhood.

MAC protocol algorithms attempt to ensure that a device's identification and the beacon slot in which it transmits its beacon are kept unique. All devices that beacon in one beacon period are defined to belong to a beacon group. A device may not hear the beacon of all the devices in its beacon group. However, the individual neighborhood information of each device is included in its beacon, and hence devices can still get information about other devices which are two hops away.

In the present Multiband OFDM Alliance (MBOA) MAC version 0.98 protocol, as well as in other wireless MAC protocols, the devices in the network are assumed to have identical transmit and receive capabilities. Hence the range of each device in the network is assumed to be the same. Every link in the wireless network is considered to be bi-directional. However, in a typical WPAN or WLAN, heterogeneous devices make up the network. The beacon frame has to be transmitted by all the devices using a specified maximum power so that all devices within the range of 10 meters will be able to receive the beacon and update their neighbor table. However, some devices like headphones, microphones and the like may have limited power capability and may not be able to transmit in the specified maximum power, hence the range of their transmissions is reduced. The beacon sent by such low power devices is not heard by some normal power devices; however, the beacon sent by normal power devices is heard by low power devices.

The qualification "low power device" in this context is used to define devices that are capable of only using low transmit power to transmit its beacon frame and other frames. It does not refer to devices that intentionally reduce the transmit power, nor does it indicate devices that are low in their battery power. Device N is a device with normal transmit power capabilities but device L can only transmit at a lower power. Hence, though the beacon of N reaches L, the beacon of L does not reach N. Then the link between N and L is said to be asymmetric.

Single hop bidirectional communication is not possible between two devices that have an asymmetric link between them. Since the beacon of L does not reach device N, some of the neighbors of N could reuse the beacon slot or data slots used by device L. This could lead to beacon slot collision and DRP collision problems at L. There is no mechanism by which L can communicate the reservation done for its applications to the devices with which it has an asymmetric link. This can cause starvation for resources and unfairness in the use of the wireless medium at the low power devices. In the current MBOA MAC protocol version 0.98, no mechanism is provided to solve the problems that arise due to asymmetric links.

Multi-hop hybrid networks may help by providing both high bandwidth and broad coverage for wireless data networks. The multi-hop hybrid networks focus on Carrier Sense Multiple Access/Collision Avoidance (CSMA/CA)-based networks and take IEEE 802.11 as a concrete example and show that the three fundamental operations of synchronization, routing and energy saving can be implemented in an integrated way. The integrated solution is based on the periodic computation of a connectivity tree among the nodes reporting to the same Access Point, starting from the Access Point itself. The nodes that are tree vertices as relays for both data and control packets (also referred to as beacons) are employed in the system, and it establishes a distributed neighbor discovery protocol and a simple centralized algorithm for computing the connectivity tree. The analysis and simulation results show that the proposed solution has low protocol overhead in terms of message passing and execution time, and it performs well even if nodes are mobile.

Thus, the above-described method is employed for periodic computation of a connectivity tree among the nodes reporting to the same Access Point, starting from the Access Point itself. It describes the use of the nodes in tree vertices as relays for both data and control packets (beacon). This multi-hop communication helps reduce energy consumption of the mobile nodes, and allows a lower interference and an increased coverage. However, the method does not describe the use of nodes as relays in cases of asymmetric links.

Accordingly, there is a need for an improved method of beacon exchange between devices with asymmetric links and a need for an improved system for using the method of beacon exchange between devices with asymmetric links.

SUMMARY OF THE INVENTION

Exemplary embodiments of the present invention address at least the above problems and/or disadvantages and provide at least the advantages described below. Accordingly, exemplary embodiments of the present invention provide a method of beacon exchange between devices with asymmetric links and a system using the method. The method and system enable a low power device to forward a beacon and beacon information to a normal power device via at least one relay device by classifying devices into low power device and normal power devices based on transmission range in order to efficiently reduce a beacon collision and a distributed reservation protocol (DRP) collision which is caused by the asymmetric links.

According to one exemplary embodiment of the present invention, there is provided a method of exchanging beacons that allows a low power device having an asymmetric link to access a wireless network to exchange beacons with any one of a plurality of normal power devices in the wireless network that has beacons. The method includes the steps of: confirming whether the low power device has the asymmetric link with the normal power device, when the low power device receives a beacon of the low power device, based on the received beacon; negotiating with at least one relay device so that the low power device requests a relay with respect to the asymmetric link, when the low power device has the asymmetric link with the normal power device; and where at least one relay device notes the results of the negotiation between the low power device and a normal power device with which the low power device is intending to communicate, based on the result of the negotiation.

According to another aspect of the exemplary embodiments of the present invention, there is provided a system of using a beacon exchange that allows a device having an asymmetric link to access a wireless network to exchange beacons with any one of a plurality of devices in the wireless network that has beacons. The system includes: a normal power device in the wireless network; a low power device for confirming whether to have the asymmetric link with the normal power device, when receiving a beacon of the normal power device, based on the received beacon, and for requesting a relay with respect to the asymmetric link, when having the asymmetric link with the normal power device; and a relay device notes the results of the request to the low power device and a normal power device with which the low power device is intending to communicate, according to the request of the low power device.

Other aspects, embodiments, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain exemplary embodiments of the present invention will be more apparent from the following detailed description, taken in conjunction with the accompanying drawings in which:

FIG. 6 is a diagram illustrating a first example of fields of asymmetric link information element (AL IE) according to an exemplary embodiment of the present invention;

FIG. 7 is a diagram illustrating a second example of fields of AL IE according to an exemplary embodiment of the present invention;

FIG. 8 is a diagram illustrating a third example of fields of AL IE according to an exemplary embodiment of the present invention;

FIG. 9 is a diagram illustrating an example of asymmetric link relay request command/information element (ARR IE) according to an exemplary embodiment of the present invention;

FIG. 10 is a diagram illustrating an example of a Beacon Forward information element, BEACON_FWD_IE, according to an exemplary embodiment of the present invention.

Throughout the drawings, the same drawing reference numerals will be understood to refer to the same elements, features and structures.

DETAILED DESCRIPTION OF EXEMPLARY EMBODIMENTS

Figure 1:
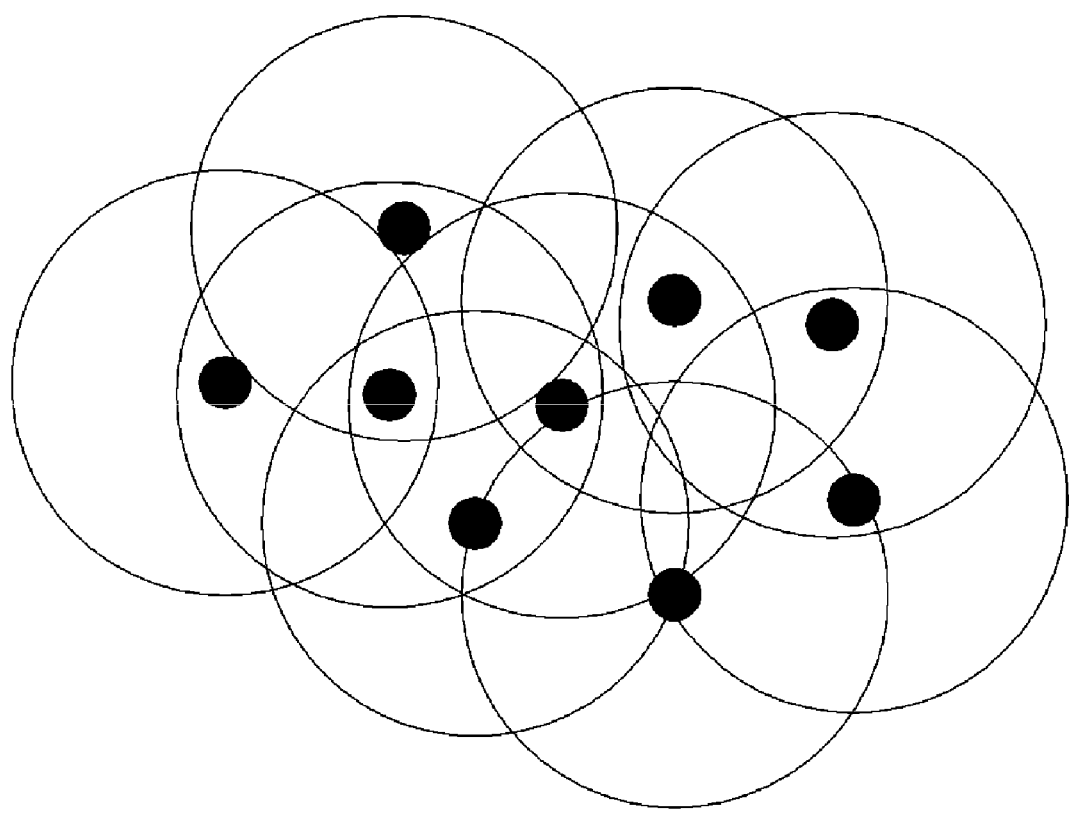
FIG. 1 is a diagram illustrating an example of wireless personal area network (WPAN) according to an exemplary embodiment of the present invention.

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

To overcome the drawbacks in the prior art, exemplary embodiments of the present invention provide for a method which facilitates the identification of asymmetric links in wireless personal area networks that arise due to low power devices and effects beacon exchange between devices with asymmetric links and a system for using the method.

In current MAC protocols, the conformance to the MAC standard would have excluded low power devices from joining the network. An exemplary embodiment of the present invention makes the joining of the low power devices to the network possible. By using this method, identification of an asymmetric link and forwarding the beacon information of the low power device to the other devices with which the low power device has an asymmetric link is achieved.

If the beacon information is not forwarded, the beacon slot and data slots used by the low power device could be re-used by other devices in the neighborhood of the normal power device, causing beacon collisions and DRP collisions.

Hence, an exemplary embodiment of the present invention provides the method for removing the instances of beacon collision and DRP collision that can arise due to an asymmetric link. The latency involved in low power devices joining the network is reduced and also the throughput reduction caused due to DRP collisions is avoided. Accordingly, an exemplary embodiment of the present invention also proposes the classification of device into two types: INHERENTLY_LOW_POWER_DEVICE and NORMAL_RANGE_DEVICE. This classification helps in quickly identifying asymmetric links and also avoids unnecessary beacon slot switch, thereby reducing the time it takes for a device to join the wireless network.

An information element called Asymmetric Link Information lists all the asymmetric links that a device is part of. The structure is defined such that the receiver can easily identify the list of low power devices and the list of normal power devices. The technique used to handle asymmetric link does not require major changes to the MBOA MAC protocol and is backward compatible to the MBOA MAC version 0.98. The system described in exemplary embodiments of this present invention identifies some devices as relay devices to forward the beacon frames between the devices that have an asymmetric link between them. Additionally, the method presents a procedure to easily identify a relay device.

If no relay device is found in the network, then the invention explains how the low power device of the identified asymmetric link has to handle the beacon and data slot collision so that beacon and data loss is reduced in the wireless network.

FIG. 1 is a diagram illustrating an example of wireless personal area network (WPAN) according to an exemplary embodiment of the present invention.

As illustrated in FIG. 1, a wireless personal area network which does not have any centralized coordinator is described. The various devices are shown as dark circles with their ranges in circles. The devices cooperate and share information with each other to perform the media access control operations. The network gives a simplistic representation, where all devices are assumed to have the same transmit power capabilities and hence their range is shown to be the same.

However, this assumption is not always valid, since devices can have varying power capabilities and have varying ranges for their broadcast communications.

Figure 2:
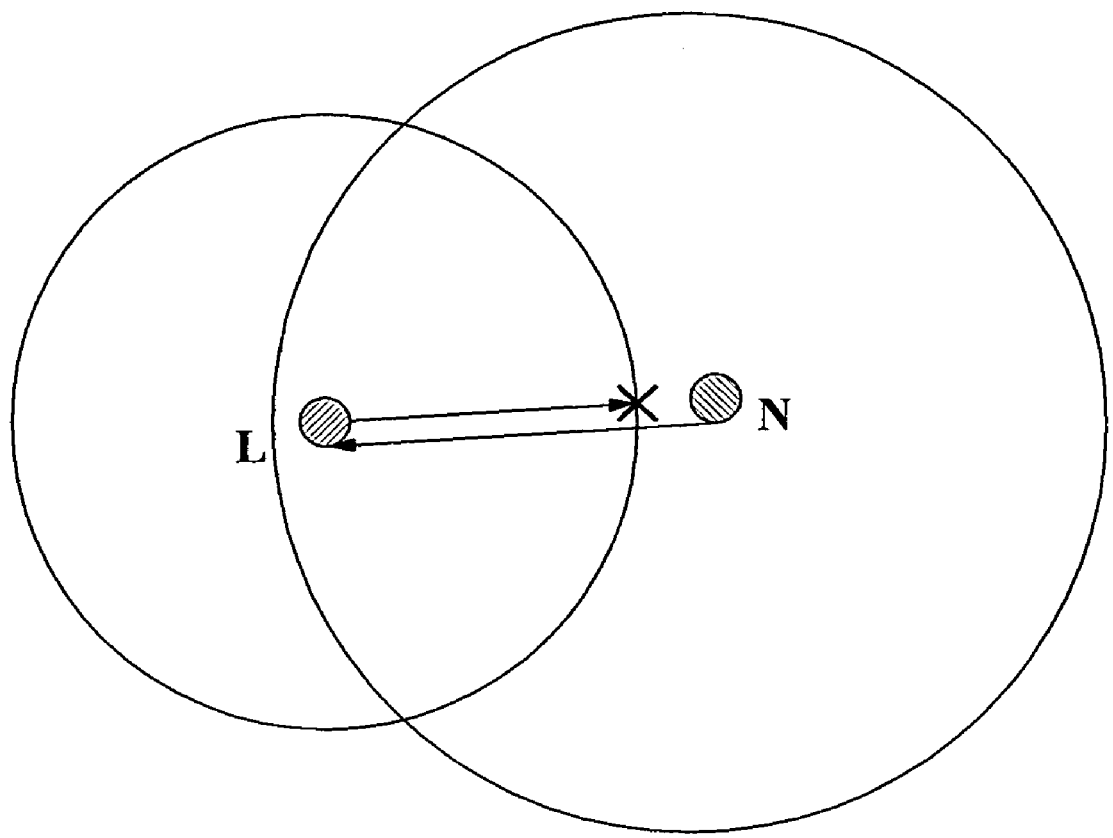
FIG. 2 is a diagram illustrating an example of an asymmetric link between devices according to an exemplary embodiment of the present invention.

FIG. 2 is a diagram illustrating an example of an asymmetric link between devices according to an exemplary embodiment of the present invention.

As illustrated in FIG. 2, an asymmetric link between two devices, which transmit beacons of the devices with different power levels, is described. Device N can transmit its beacon at the maximum power specified in the MAC PHY interface. The beacon sent by device N is received by device L. Device L has transmit power constraints and can transmit only at a lower power. The beacon sent by device L does not reach device N. Due to this asymmetry, device N will be listed as a neighbor in the neighbor table maintained by L, but device L will not be known to device N.

An exemplary embodiment of the present invention proposes to qualify devices into different types based on their transmission range as 'INHERENTLY_LOW_POWER_DEVICE' and 'NORMAL_RANGE_DEVICE'.

A device that can inherently only use transmit power less than what is given by the MAC PHY specification as the beacon transmit power or maximum is classified as an INHERENTLY_LOW_POWER_DEVICE. This information can be provided during the MAC configuration and maintained in the MAC layer which is useful in quickly identifying asymmetric links. By default, the device transmission range type will be set to NORMAL_RANGE_DEVICE.

Figure 3:
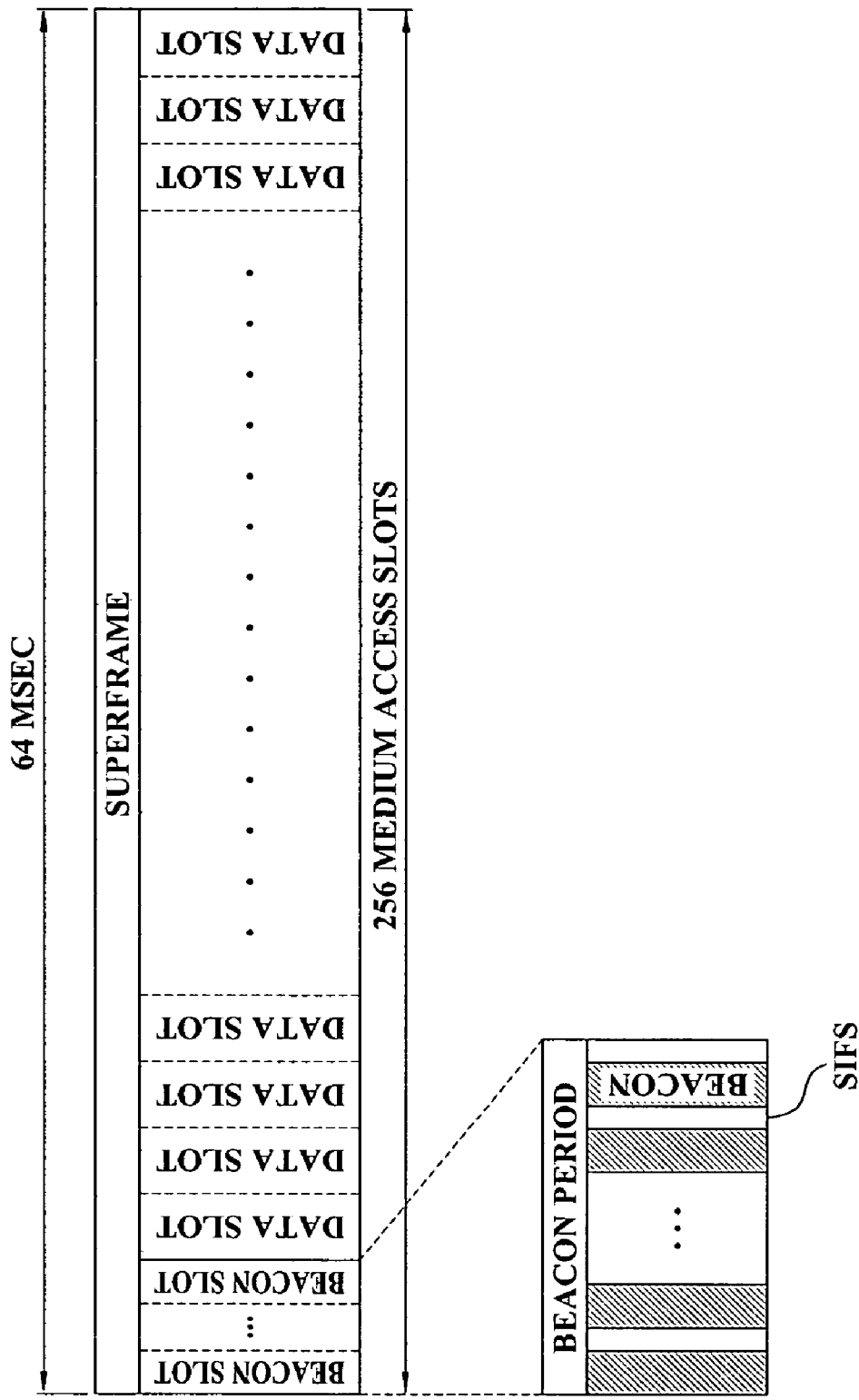
FIG. 3 is a diagram illustrating an example of a configuration of a superframe according to an exemplary embodiment of the present invention.

FIG. 3 is a diagram illustrating an example of a configuration of a superframe according to an exemplary embodiment of the present invention.

As illustrated in FIG. 3, a structure of beacon slots and data slots within the superframe is described. Numbers in FIG. 3 indicates a superframe duration, beacon slot number, and data slot number. A change in these numbers does not affect the operation of the present invention. The control information is transmitted by devices in beacon frames in chosen beacon slots. The data slots are used for communication and are reserved using the distributed reservation protocol.

During network creation, in every superframe, an active mode device shall transmit a beacon in the BP and listen for neighbor's beacons in all beacon slots specified by its BP length. When transmitting in a beacon slot, a device shall start transmission of the frame on the medium at the beginning of that beacon slot. Devices have to transmit the beacon using a predefined transmission rate, pBeaconTransmitRate, and the transmission should not exceed the mMaxBeaconLength. For beacon transmission purposes a device shall consider a beacon slot available, if in the lastest mMaxLostBeacons superframes the slot was not marked as occupied in the beacon period occupancy information element (BPOIE) transmitted or received by the device. In order to detect beacon collision a device shall randomly skip beacon transmission and listen if a neighbor is trying to use its beacon slot. If a device does not receive a beacon from a neighbor in one superframe, it shall use the information in the beacon received in the previous superframe from the neighbor as though it was received in this current superframe. If a device does not receive a beacon from another device for more than mMaxLostBeacons consecutive superframes, it shall not consider the device as its neighbor for the purpose of its communication.

A device listening to beacons during the beacon period identifies that a beacon collision has happened if its beacon slot is reported as occupied in the BPOIE in any beacon it receives in the current superframe and the DevID of the slot is not its own DevID, or while skipping beacon transmission, the device hears a beacon in the current superframe or after skipping a beacon transmission, in the next superframe it hears a beacon where in the BPOIE its beacon slot is marked as occupied by some other device. Beacon collision is a main problem that can arise in networks that have asymmetric links. If a device detects a beacon collision it will stop beaconing in the current beacon slot and then chose a new slot that is after the maximum used slot in the beacon period and start sending its beacon in that slot. If an asymmetric link is not identified, this process of beacon shifting will have to be done several times by the low power device.

Devices engaged in DRP negotiation could attempt to reserve the same MAS slots or due to mobility, devices could have the same slots marked as reserved. A DRP collision exists if the same set of slots is marked as reserved in two DRP-IE messages of different pairs of devices. DRP collision needs to be resolved or else it can lead to data loss in both the links. DRP collision is more likely to happen in wireless networks that have several asymmetric links, since the DRP-IE of the low power device is not known to the normal power devices outside its range.

The occurrence of Beacon and DRP collision can be reduced and avoided in networks with asymmetric links, by making sure that the information contained in the beacon of the low power device is forwarded to the devices with which it has an asymmetric link. The method described in exemplary embodiments of present invention explains the deterministic steps to be followed before declaring a link as asymmetric and then further, provides a method using which the problems that occur due to asymmetry of the link can be averted.

Figure 4:
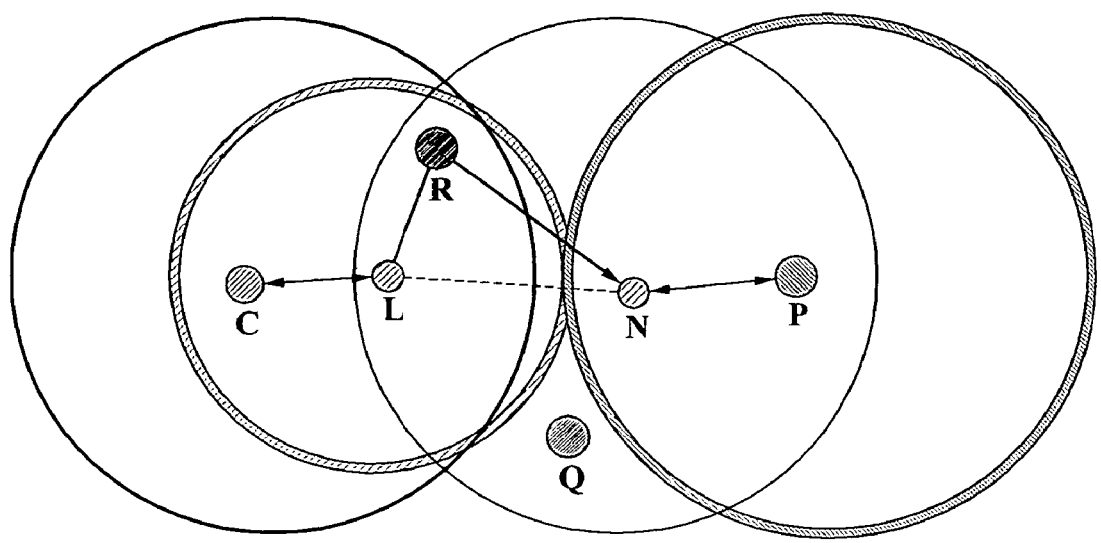
FIG. 4 is a diagram illustrating an example of a system for beacon exchange between devices with asymmetric links according to an exemplary embodiment of the present invention.

FIG. 4 is a diagram illustrating an example of a system for beacon exchange between devices with asymmetric links according to an exemplary embodiment of the present invention.

As illustrated in FIG. 4, the system for beacon exchange between devices with asymmetric links is described. All devices except a device L may transmit at a same maximum power as warranted by a MBOA MAC PHY specification. L is a device with low power capability; hence its beacon is received by devices C and R only. The beacon of L does not reach devices N and Q, though beacon of device N and Q is received at L. Asymmetric link exists between devices N, L and devices N, Q.

Figure 5:
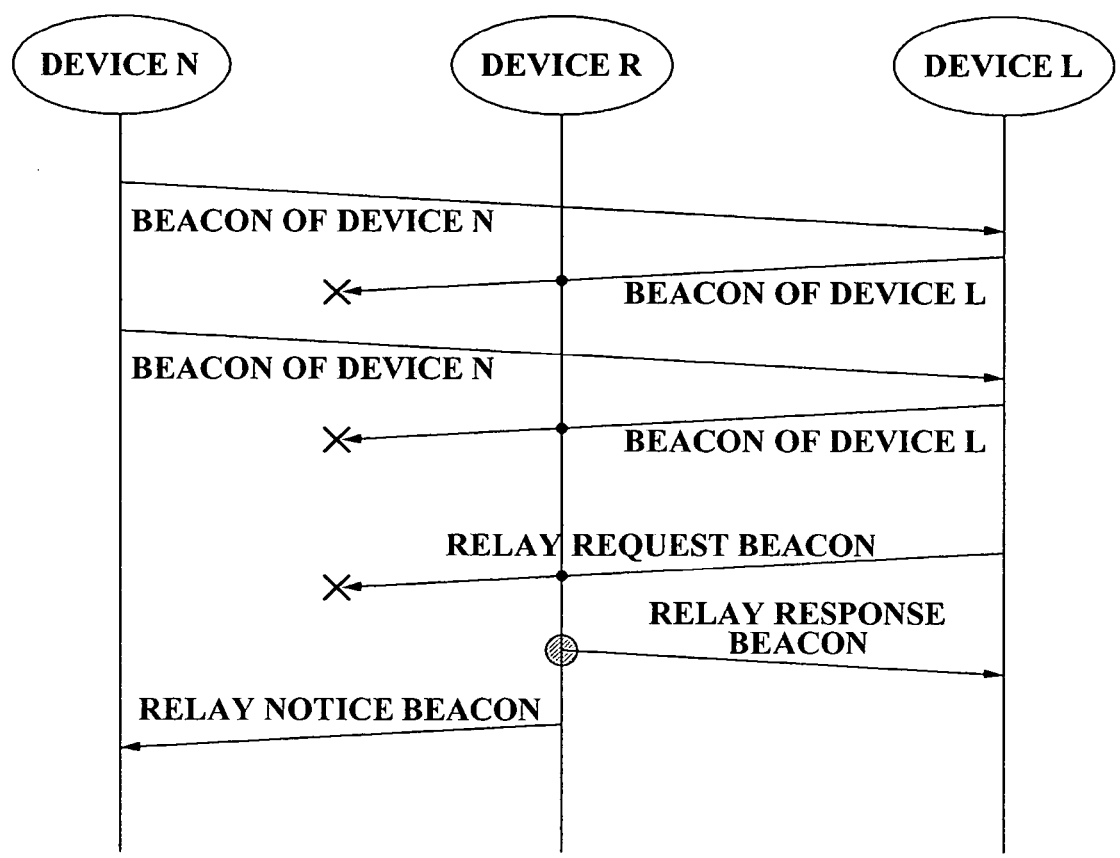
FIG. 5 is a diagram illustrating an example of a method of beacon exchange between devices with asymmetric links according to an exemplary embodiment of the present invention.

FIG. 5 is a diagram illustrating an example of a method of beacon exchange between devices with asymmetric links according to an exemplary embodiment of the present invention.

As illustrated in FIG. 5, a sequence of control frames which are exchanged between the devices in a wireless network in order to identify a relay device that may forward beacons for a low power device. Asymmetric relay request and response messages are used to decide on the relay device that is used between two devices that have an asymmetric link between them.

In the exemplary description provided below, the device that has a smaller transmission range is referred to as device L and peer device with which it has an asymmetric link is referred to as device N. The following steps are followed by these two devices to first identify that there exists an asymmetric link between them.

Scenario 1: Consider the case where device N is already in the network and device L starts beaconing.

1. Device L hears the beacon of all its neighbors including device N and device L chooses to use a new slot not used by any of the devices in its beacon group.

2. Device L continues to listen to the beacons of its neighbors and sees that the BPOIE sent by device N is not including the beacon slot and DevID of L. The beacon slot used by L is marked as free in the BPOIE of N. This is an important condition to be checked before deciding if a link is asymmetric or not. In the case of beacon collision, device N will reflect Broadcast address or a different device's identifier in the slot used by L, hence when its beacon slot is being marked as free in another device's BPOIE, device L should not consider it as a case of beacon collision. The same BPOIE response will be seen from other devices which also have an asymmetric link with L (like device Q).

3. Device L should continue to beacon in the same slot. If device L is an INHERENTLY_LOW_POWER_DEVICE, then at the end of mMaxLostBeacons superframes, device L will decide that it has an asymmetric link with N. However, if device L is a NORMAL_RANGE_DEVICE then device L should continue to beacon in the same slot for a new superframe count of mIdentifyALCount. At the end of mIdentifyALCount superframes, if N still continues to reflect the beacon slot used by L as free, then L will decide that it has an asymmetric link with N.

No beacon shift is required, as this scenario does not constitute a beacon collision as defined in MBOA MAC version 0.98. Until the mMaxLostBeacons or mIdentifyALCount superframes is reached, if there is any change in the information in the BPOIE slot status then the scenario reduces to what is described below.

Scenario 2: Consider the case where device N is already in the network and device L starts beaconing.

1. Device L hears the beacon of all its neighbors including device N and device L and chooses to use a new slot not used by any of the devices in its beacon group.

2. In the next superframe, device L hears the beacon of device N and in its BPOIE sees that L's beacon slot is marked as used by another device. This is the case of beacon slot collision between device L and another neighbor device of N which is outside the range of L.

3. If L is an INHERENTLY_LOW_POWER_DEVICE, it should continue to beacon in its slot and process the BPOIE received from N for mMaxLostBeacons superframes. If N, continues to reflect another device's DevID in its BPOIE, then it is not a situation of beacon collision, hence, device L decides that it has an asymmetric link with N. The operation of device L continuing to send beacon in a slot that is marked as occupied by its neighbor is deviating from the MAC MBOA version 0.98 and is done only by the device that is qualified as INHERENTLY_LOW_POWER_DEVICE.

4. If L is a NORMAL_RANGE_DEVICE device it will consider the situation in step 2 as a beacon collision and shift to another beacon slot which is free according to the beacons received by it. This step is continued till a unique beacon slot is found by L and its DevID is reflected in the BPOIE of N or the situation reduces to scenario 1 and device L decides that it has an asymmetric link with N.

Scenario 3: Consider the case where device N is already in the network and device L starts beaconing.

1. Device L hears the beacon of all its neighbors including device N and device L chooses to use a new slot not used by any of the devices in its beacon group.

2. In the next superframe, device L hears the beacon of device N and in its BPOIE sees that the beacon slot used by L is marked as used by Broadcast device. This is the case of beacon slot collision between device L and another neighbor device of N which is outside the range of L. Hence, for this situation device L will function as in the MBOA MAC version 0.98 and shift to a new beacon slot that is available in its neighborhood. After the beacon shift, for the identification of asymmetric link the beacon logic will reduce to either scenario 1 or scenario 2.

If there is no asymmetric link between two devices, then after beacon collision resolution the BPOIE of all participating devices will show the respective beacon slot and device identifier information.

The advantage of qualifying devices as INHERENTLY_LOW_POWER_DEVICE and NORMAL_RANGE_DEVICE is that low power devices can identify an asymmetric link in a maximum time duration of mMaxLostBeacons superframes and they need not switch the beacon slot for situations not identified as beacon collision. Devices classified as NORMAL_RANGE_DEVICE would try to change beacon slot as long as the beacon collision is resolved or an asymmetric link is identified.

FIGS. 6, 7, and 8 are diagrams illustrating examples of fields of asymmetric link information element (AL IE) according to an exemplary embodiment of the present invention.

As illustrated in FIGS. 6, 7, and 8, fields of AL IE are described. This information element is sent by both the devices that have an asymmetric link between them. The generic format of the information element is given in FIG. 6, and it includes a number of asymmetric links, a device identification of a plurality of low power devices, and a device identification of a plurality of normal power devices. The AL IE sent by the low power device will have the format as shown in FIG. 7, and it includes the number of asymmetric links, a device identification of low power device, and a device identification of the plurality of normal power devices. The format sent by the normal power device will have the format as shown in FIG. 8, and it includes the number of asymmetric links, a device identification of the plurality of low power device, and a device identification of normal power device.

If the DevID of the sender of the AL IE is included as the second field in the information element then it is an AL IE sent by the low power device otherwise it is an AL IE sent by the normal device. This format effectively conveys which device is a low power device and also includes the information of all asymmetric links of a device in one information element.

An exemplary implementation of the invention introduces a new information element called Asymmetric Link Information Element, AL IE as illustrated in FIG. 6. The low power device will include the Asymmetric Link Information Element as depicted in FIG. 7 and the normal device will include the Asymmetric Link Information Element as depicted in FIG. 8. The AL IE can be updated as and when a device identifies more asymmetric links with other devices. The normal power device N in the asymmetric link will also have to transmit the AL IE so that its neighbors are aware that it has a unidirectional link with device L and this information can be used by routing algorithms such that bidirectional traffic is not forwarded through the asymmetric link.

Additionally, the system and method presented according to the exemplary embodiments of the present invention provide for a method by which the beacon of the low power device is made known to the normal range device of an asymmetric link. The exemplary embodiments of the present invention describe a novel method and system by which beacon control frame is forwarded to devices such that consistent information about the neighbors is maintained at all the devices in a beacon group. The invention proposes the use of a relay device called Asymmetric Link Relay device, represented as AR device. The low power device will choose a common neighbor between itself and the normal power device with which it has an asymmetric link as a relay device. A negotiation process is initiated between the low power device and the AR device.

When having the asymmetric link with the normal power device, the low power device negotiates with the relay device for requesting a relay with respect to the asymmetric link. As an example, an Asymmetric Link Relay Request Command/IE (ARR IE), which is used to negotiate with the relay device as a relay request beacon and relay response beacon, is described in detail with reference to FIG. 9.

FIG. 9 is a diagram illustrating an example of asymmetric link relay request command/information element (ARR IE) according to an exemplary embodiment of the present invention.

As illustrated in FIG. 9, a new command frame or IE called Asymmetric Link Relay Request Command/IE (ARR IE) is used by a low power device to negotiate with a neighbor device, requesting it to function as a relay device. ARR IE includes the device identifier of the low power device, the device identifier of the normal device and a Status Code.

If the relay device is willing to forward the beacon of the low power device, then it will send an ARR IE with the status flag as Accepted. However, the neighbor device can also chose to reject the relay request by responding to the relay request message with status as Rejected. The low power device has to start the negotiation process with some other common neighbor device.

If the AR device accepts to forward the beacon information of the low power device then it includes the beacon of the low power device in a BEACON_FWD_IE and broadcasts it along with its beacon.

The relay device notes a result of the negotiation between the low power device and a normal power device with which the low power device is intended to communicate. As an example, a Beacon Forward Information Element, BEA- CON_FWD_IE, which is used when noting the result of the negotiation, is described with reference to FIG. 10.

FIG. 10 is a diagram illustrating an example of a Beacon Forward information element, BEACON_FWD_IE according to an exemplary embodiment of the present invention.

As illustrated in FIG. 10, fields of the BEACON_FWD_IE are described. This new information element is added by the relay device in its beacon to forward the beacon information of the low power device to the normal device. The first field of the Beacon forward information element specifies the number of device identifiers that are included in this BEACON_FWD_IE. Secondly, BEACON_FWD_IE lists the device identifiers of all the normal power devices for whom the beacon is being forwarded. The last field is the beacon frame of the low power device as received at the relay device. The BEACON_FWD_IE need not be included in every beacon of the relay device. The relay device can choose to include the BEACON_FWD_IE periodically, but at least once every mMaxLostBeacons. The normal device should maintain the beacon slot information of the low power device for a larger count of superframes (say mLargeMaxLostBeacons), since the beacon is only forwarded periodically and also that in the case of a relay device going down or moving out of its neighborhood, a new relay device has to be negotiated.

Figure 11:
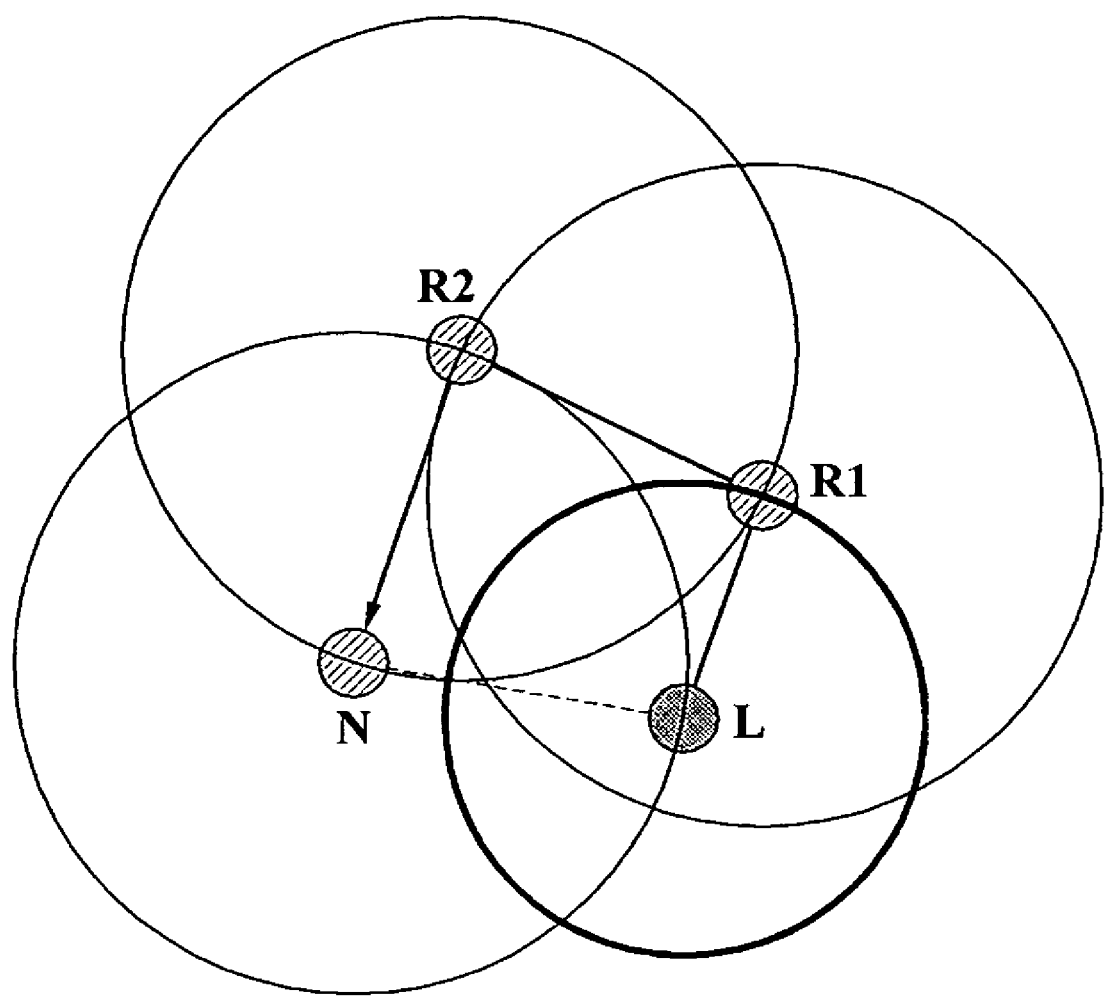
FIG. 11 is a diagram illustrating an example of a system for beacon exchange between devices with asymmetric links according to another exemplary embodiment of the present invention.

FIG. 11 is a diagram illustrating an example of a system for beacon exchange between devices with asymmetric links according to another exemplary embodiment of the present invention.

As illustrated in FIG. 11, a system for beacon exchange between devices with asymmetric links is described. If the topology of the network is such that there is no common neighbor between the devices of an asymmetric link, i.e., in case that there is no response after some trial of the relay request, the low power devices may try to look for the common node within two hop distances. For this, the low power device tries to broadcast the beacon limited to two hops. By the distance limitation, the unnecessary broadcast overhead may be reduced.

For example, the following topology condition is considered. The first relay node, R1, do not have the connectivity with N node. So, L node tries to look for another node that can deliver the related information within two hop distances. From this process, L node can provide its beacon slot information to N node through R1 and R2.

Exemplary embodiments of the present invention describe a method to identify asymmetric links in a wireless personal area network. The MBOA MAC protocol is used in specific to explain the proposed method. The invention also provides a mechanism for creating a consistent list of network neighborhood information in devices that are part of asymmetric links.

Devices that implement the MBOA MAC protocol have to be compliant with the MAC and MAC PHY interface specifications. Certain low end devices like headphones, speakers, and microphones could be part of the UWB network and have a compliant MAC implementation, except that their physical layer constraint of not being able to transmit frames at the maximum power as required by the MBOA MAC PHY interface. Due to this limitation, the transmission range of these devices is reduced. The current MBOA MAC does not allow such devices to be part of the UWB MBOA wireless personal area network. The system and method described in the exemplary embodiments of the present invention describe how such low power devices can also join the UWB network and communicate with other devices in its neighborhood.

The above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides and so on. including a carrier wave transmitting signals specifying the program instructions, data structures and so on. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to an aspect of exemplary embodiments of the present invention, a method of beacon exchange between devices with asymmetric links and a system using the method has the asymmetric links which enables a low power device to forward a normal power device and a beacon via at least one relay device by classifying devices into the low power device and the normal power device based on a transmission range in order to efficiently reduce a beacon collision and a distributed reservation protocol (DRP) collision which is caused by the asymmetric links.

While the invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of beacon exchange for allowing a low power device having an asymmetric link to access a wireless network to exchange beacons with any one of a plurality of normal power devices in the wireless network, the method comprising:

confirming whether the low power device has an asymmetric link with a normal power device, when the low power device receives a beacon of the normal power device, based on the received beacon;

negotiating with at least one relay device so that the low power device requests a relay with respect to the asymmetric link, when the low power device has the asymmetric link with the normal power device; and the at least one relay device noting a result of the negotiating to the low power device and to a normal power device with which the low power device is desired to communicate, based on the result of the negotiating.

2. The method of claim 1, wherein the wireless network comprises a normal power device, which may transmit the beacon at a maximum power which is specified in a medium access control physical layer (MAC PHY) interface classified based on a transmission range, and a low power device, which may transmit the beacon at a power which is less than the maximum power.

3. The method of claim 1, wherein the confirming comprises:

the low power device selecting a single beacon slot which is not used by neighbor devices, when the low power device receives a beacon of the neighbor devices including the normal power device;

the low power device transmitting the beacon via a selected beacon slot; and the low power device confirming whether the low power device has the asymmetric link with the normal power device, when the low power device receives the beacon from the normal power device, based on the received beacon.

4. The method of claim 3, wherein the confirming whether the low power device has the asymmetric link with the normal power device comprises:
the low power device confirming whether the selected beacon slot is used based on a beacon period occupancy information element (BPOIE) field within the received beacon, and whether a device identification of the low power device is included.

5. The method of claim 1, wherein the negotiating comprises:
the low power device generating a relay request beacon for an asymmetric link relay request and transmitting the generated relay request beacon to the at least one relay device, as a result of the confirming.

6. The method of claim 5, wherein the relay request beacon comprises an information element comprising a device identification of the low power device, a device identification of the normal power device, and a status code for the asymmetric link relay request.

7. The method of claim 1, wherein the noting comprises:
the relay device transmitting a relay response beacon for a relay acceptance to the low power device in response to a relay request beacon, when the relay device receives the relay request beacon; and
forwarding a relay notice beacon, including the beacon which is received from the low power device, to the normal power device, after the relay device transmits the relay response beacon.

8. The method of claim 7, wherein the relay response beacon comprises an information element comprising a device identification of the low power device, a device identification of the normal power device, and a status code for a relay acceptance of the asymmetric link.

9. The method of claim 7, wherein the relay notice beacon comprises an information element comprising a number of the asymmetric links, a device identification of the plurality of normal power devices, and the beacon which is received from the low power device.

10. The method of claim 1, further comprising:
the low power device broadcasting a beacon including a number of the asymmetric links, a device identification of the low power device, and a device identification of the plurality of normal power devices, when the low power device has the asymmetric link with the normal power device.

11. The method of claim 1, further comprising:
the normal power device broadcasting a beacon including a number of the asymmetric links, a device identification of the normal power device, and a device identification of a plurality of low power devices, when the normal power device has the asymmetric link with the low power device.

12. The method of claim 1, further comprising:
the low power device transmitting the beacon to the normal power device via the at least one relay device, after noting a result of the negotiating to the normal power device.

13. A system of beacon exchange for allowing a device having an asymmetric link to access a wireless network exchanges beacons with any one of a plurality of devices in the wireless network, the system comprising:
a normal power device in the wireless network;
a low power device for confirming whether to have the asymmetric link with the normal power device, when receiving a beacon of the normal power device, based on the received beacon, and for requesting a relay with respect to the asymmetric link, when having the asymmetric link with the normal power device; and
a relay device for noting a result of the requesting to the low power device and a normal power device with which the low power device is desired to communicate, according to the request of the low power device.

14. The system of claim 13, wherein the wireless network comprises the normal power device, which may transmit the beacon at a maximum power which is specified in a MAC PHY interface classified based on a transmission range, and a low power device, which may transmit the beacon at a power which is less than the maximum power.

15. The system of claim 13, wherein the low power device receives a beacon of the neighbor devices including the normal power device, selects a single beacon slot which is not used by neighbor devices, and transmits the beacon via the selected beacon slot.

16. The system of claim 15, wherein the low power device, when receiving the beacon from the normal power device, confirms whether the selected beacon slot is used based on a BPOIE field within the received beacon, and whether a device identification of the low power device is included.

17. The system of claim 13, wherein the low power device generates a relay request beacon for an asymmetric link relay request and transmits the generated relay request beacon to the at least one relay device, when having the asymmetric link with the normal power device.

18. The system of claim 17, wherein the relay request beacon comprises an information element comprising a device identification of the low power device, a device identification of the normal power device, and a status code for the asymmetric link relay request.

19. The system of claim 13, wherein the relay device transmits a relay response beacon for a relay acceptance to the low power device in response to a relay request beacon, when receiving the relay request beacon, and forwards a relay notice beacon, including the beacon which is received from the low power device, to the normal power device.

20. The system of claim 19, wherein the relay response beacon comprises an information element comprising a device identification of the low power device, a device identification of the normal power device, and a status code for a relay acceptance of the asymmetric link.

21. The system of claim 19, wherein the relay notice beacon comprises an information element comprising a number of the asymmetric links, a device identification of the plurality of normal power devices, and the beacon which is received from the low power device.

22. The system of claim 13, wherein the low power device broadcasts a beacon including a number of the asymmetric links, a device identification of the low power device, and a device identification of the plurality of normal power devices, when having the asymmetric link with the normal power device.

23. The system of claim 13, wherein the normal power device broadcasts a beacon including a number of the asymmetric links, a device identification of the normal power device, and a device identification of a plurality of low power devices, when having the asymmetric link with the low power device.

24. The system of claim 13, wherein the low power device transmitting a beacon to the normal power device via the at least one relay device, after the relay device notes a result of the requesting to the normal power device.

25. A computer-readable storage medium encoded with a program for implementing the method of claim 1.

* * * * *